United States Patent [19]

Meyer

[11] Patent Number: 5,502,500
[45] Date of Patent: Mar. 26, 1996

[54] CIRCUIT FOR EXTRACTING A SYNCHRONIZATION SIGNAL FROM A COMPOSITE VIDEO SIGNAL, IN MOS TECHNOLOGY

[75] Inventor: Jacques Meyer, Corenc, France

[73] Assignee: SGS-Thomson Microelectronics S.A., Pouilly, France

[21] Appl. No.: 54,592

[22] Filed: Apr. 29, 1993

[30] Foreign Application Priority Data

Apr. 30, 1992 [FR] France .................. 92 05753

[51] Int. Cl.$^6$ .................................. H04N 5/08
[52] U.S. Cl. .......................... 348/525; 348/532
[58] Field of Search ................ 358/148, 153, 358/154, 155, 156; 328/139, 115; 348/525–535; H04N 5/08, 5/10

[56] References Cited

U.S. PATENT DOCUMENTS

| | | | |
|---|---|---|---|
| 4,064,541 | 12/1977 | Schneider et al. | 358/153 |
| 4,097,896 | 6/1978 | Avery | 358/153 |
| 4,385,319 | 5/1983 | Hasegawa . | |
| 4,550,342 | 10/1985 | Buchanan et al. | 358/153 |
| 4,631,740 | 12/1986 | Collins . | |
| 4,672,450 | 6/1987 | Collins . | |
| 4,680,626 | 7/1987 | Deering et al. . | |
| 5,045,943 | 9/1991 | Kurihara | 358/153 |

Primary Examiner—James J. Groody
Assistant Examiner—Michael H. Lee
Attorney, Agent, or Firm—David M. Driscoll; James H. Morris; Brett N. Dorny

[57] ABSTRACT

A circuit that extracts the synchronization signal from a composite video signal. The circuit includes a stage for aligning the low level of the synchronization signal interval with a reference voltage; a stage for detecting the signal suppression level and a comparator for comparing the aligned video signal with a value intermediate between the low level of the synchronization interval and the signal suppression level. The detecting stage includes a second comparator charging or discharging a capacitor depending on the polarity of the voltage difference across its inputs. The ratio Ic/Id between the values of the charging and discharging currents is selected (approximately equal to 8 in one embodiment) to obtain the suitable value Vsup at the second input of the comparator.

25 Claims, 2 Drawing Sheets

CIRCUIT FOR EXTRACTING A SYNCHRONIZATION SIGNAL FROM A COMPOSITE VIDEO SIGNAL, IN MOS TECHNOLOGY

BACKGROUND OF THE INVENTION

1. Field of the Invention

The present invention relates to integrated circuits used for processing TV-type signals, i.e., composite signals representing picture lines including, for each line, a series of at least three signal portions: a portion of synchronization signal, a portion of suppression signal during which no picture information is transmitted, and the useful signal representing the information corresponding to the current picture line.

2. Discussion of the Related Art

FIG. 1 represents the standardized structure of a TV or composite video signal, as used not only for transmission of TV signals but also for video tape recorders and other picture display systems.

Assuming that the reference voltage is the voltage level Vsup transmitted during the information suppression phase. Then, the beginning of a line is marked with a synchronization signal which is a negative pulse having edges as sharp as possible and having a time duration of approximately 4.7 μs. The suppression level Vsup is then emitted for approximately 5.3 μs, the useful signal is emitted as a positive value above the suppression level for 52 μs, and last the suppression level is re-emitted for approximately 2 μs. The total transmission duration for a line is then approximately 64 μs.

To operate a TV circuit, the line synchronization signal has to be extracted since it must control the line retrace of the screen scanning spot or, in matrix display systems, it must determine the addressing sequences of the various lines.

In the prior art, the circuits for extracting synchronization signals are generally fabricated in a bipolar integrated circuit technology. Such a technology is conventionally adapted to analog electronic circuits.

The principle of the most commonly used extracting circuits is illustrated in FIG. 2.

To provide a pulse at the occurrence of the synchronization interval, it is merely necessary to compare the composite video signal with an intermediate threshold value between the low voltage level Vsyn of the synchronization interval and the suppression voltage level Vsup. The most advantageous approach is to establish a threshold having a value (Vsup+Vsyn)/2. A comparator receiving the composite video signal and the threshold provides one pulse each time the video signal goes below the threshold, i.e., at the occurrence of the synchronization interval.

However, to achieve this purpose, this threshold must be established; it is therefore necessary to know the levels Vsup and Vsyn of the received signal. Such levels are not known beforehand. Thus, they must be determined from the signal received.

Moreover, when the composite video signal arrives, it is not referenced with respect to a reference voltage: it is a variable signal without any fixed d.c. value.

That is the reason why the following several steps are necessary: fixing a reference voltage of the composite signal, determining voltages Vsyn and Vsup with respect to this reference, establishing a threshold value (Vsyn+Vsup)/2, and comparing the aligned composite signal with this threshold.

In conventional circuits, the principle of which is represented in FIG. 2, the suppression level Vsup of the video signal is aligned with a reference voltage Vref.

To achieve this alignment, the composite video signal Sv is applied, through a first series capacitor C1, to an input terminal B1 of an integrated circuit. Signal Sv is offset by a value corresponding to the d.c. charge value of capacitor C1, to provide a signal Sv'. A first circuit stage, connected to terminal B1, then controls charging of capacitor C1 so that the offset signal Sv' has its mean suppression level Vsup exactly equal to a reference voltage Vref.

This alignment stage mainly includes a differential amplifier AD1, one input of which is connected to voltage Vref, and another input is connected to terminal B1. The comparator output controls either the activation of a charging current source SCc of capacitor C1, tending to increase the d.c. voltage across the capacitor, or the activation of a discharging current source SCd, tending to decrease this d.c. value. The ratio between the charging and discharging currents is such that charging of capacitor C1 is then automatically balanced said that the suppression voltage Vsup of signal Sv' is equal to Vref.

A second circuit stage then establishes a voltage Vsyn equal to the low voltage of the synchronization interval of signal Sv'. This second stage is simply a detector for detecting the negative peak value of signal Sv'. The circuit includes a capacitor C2 operable to store a d.c. charge representing level Vsyn. Capacitor C2 is connected between a terminal B2 and ground. A differential amplifier AD2 having a feedback loop including a diode D1 receives at one input signal Sv' and at the other input the voltage stored in capacitor C2. Diode D1 is operable to rapidly discharge the capacitor when the level of signal Sv' drops below the level stored in capacitor C2. As a result, the voltage level of capacitor C2 is continuously regulated to the value of the lowest level of signal Sv', i.e., Vsyn. A charging resistor R1 slowly recharges the capacitor when the low level of the synchronization interval tends to increase. Last, a follower stage (amplifier AD3 having a feedback loop to provide a unity gain) allows for exactly copying the voltage Vsyn present across the capacitor to apply it to a resistive divider. The follower stage avoids any spurious discharging of capacitor C2 through the divider resistors.

Last, the extracting circuit includes a third stage which is a stage comparing signal Sv' with a threshold equal to (Vsyn+Vsup)/2, i.e., which threshold is now equal to (Vsyn+Vref)/2. This third stage includes the above mentioned resistive divider, with two resistors R having the same value and serially connected between the output of the follower stage (at Vsyn) and the reference voltage Vref. A comparator (a differential amplifier AD4) receives at one input the signal Sv' and, at another input, the signal at tap T (the "medium" tap) of the resistive divider. The differential amplifier AD4 provides at its output S the synchronization signal extracted from the video signal.

In some applications, it is desirable to provide complex circuits for processing video signals, in which the circuit for extracting the synchronization is one component among others. For such circuits, it becomes necessary to use MOS technologies (i.e., technologies using insulated-gate field effect transistors). This may be due to the fact that the number of transistors is very high (for example, several tens or hundreds of thousand transistors); in this case, the requirement to decrease power consumption leads to the use of low power consumption technologies (technologies such as complementary MOS transistors). Another reason can be that most of the circuits to be fabricated are logic circuits instead of analog circuits because MOS technologies lend themselves to logic circuits more easily than bipolar technologies.

In these cases, if it is desired to avoid using dual (bipolar/ MOS) technologies which are expensive, all the circuits must be fabricated with MOS transistors.

However, it has been noted that the circuit of FIG. 2, easily realizable in bipolar technology, becomes complex, cumbersome and unreliable when it is transposed into MOS technology.

Amongst the explanations that can be given, one reason is that it is not possible to easily provide reference voltage sources such as voltage Vref which must be identically applied to two different points of the circuit. Another reason is that differential amplifiers have an offset voltage substantially higher in MOS technology than in bipolar technology when simple amplifying circuits are used. However, these offset voltages directly affect the precision with which levels Vsyn and Vsup are established, and therefore on the threshold (Vsyn+Vsup)/2 and on the comparison of Sv' with this threshold. By way of example, the order of magnitude of the difference between Vsup and Vsyn is approximately 150–300 mV whereas the offset voltages of the MOS differential amplifiers commonly have a 10–20 mV dispersion. Last, the amplifier followers are more critical when fabricated in MOS technology (the risk for instability is higher).

One of the objects of the invention is to provide a circuit for extracting the synchronization signal from a composite video signal, capable of receiving the composite video signal and providing a synchronization pulse at the beginning of each line.

SUMMARY OF THE INVENTION

The invention provides a particularly advantageous approach for providing a circuit extracting the synchronization signal in MOS technology.

The circuit according to the invention, coupled between a supply terminal (Vcc) and a ground terminal (Vss), includes the following components: means for aligning the composite signal with a reference voltage and an output comparator for comparing the aligned composite signal with a level which is intermediate between the low level (Vsyn) of the synchronization interval and a signal suppression level (Vsup). Additionally, the circuit according to the invention includes:

a stage for aligning the low level (Vsyn) of the synchronization interval with the ground voltage (Vss);

a stage for detecting the suppression level (Vsup) of the composite signal (Sv') aligned by the alignment circuit; the stage includes a capacitor, a second comparator having a first input to receive the aligned composite signal and a second input, this comparator controlling charging or discharging of the capacitor depending on the polarity of the voltage difference between its inputs, and a negative feedback transistor whose gate is connected to the capacitor and source to the second input of the second comparator to vary the voltage at this second input when charging of the capacitor varies, in direction correlated with the variation direction of such charging; and a voltage divider connected between the second input of the second amplifier and ground, the output comparator having an input connected to the medium tap of the divider and a second input receiving the aligned composite signal (Sv').

The intermediate threshold level between Vsup and Vsyn is preferably half the sum of (Vsup+Vsyn).

The comparators are preferably simple differential amplifiers. The circuit does not use any differential amplifier having a feedback loop to provide for unity gain.

The capacitor used in the stage for detecting the suppression level stores a voltage that need not be precisely voltage Vsup.

The capacitor can be external to the chip on which is integrated the extracting circuit.

The circuit for aligning the low level of the synchronization interval with ground preferably includes: a second capacitor receiving at one terminal the nonaligned composite video signal and providing at its second terminal the aligned video signal, a first transistor adapted to rapidly charge this capacitor as soon as the aligned composite signal tends to fall below the ground voltage, the source of the first transistor being connected to the second terminal of the capacitor and its gate being connected to the gate of a second transistor connected as a diode and fed by a current source, the source of the second transistor being grounded.

A current leakage leg is preferably disposed between the second terminal of the capacitor and ground.

Last, preferably, the comparators of the circuit according to the invention include an input stage realized with P-channel input transistors if the ground is the most negative voltage of the power supply terminals, so as to detect the polarity of the difference between the input voltages even when these voltages have values very close to the ground voltage.

The foregoing and other objects, features, aspects and advantages of the invention will become apparent from the following detailed description of the present invention which should be read in conjunction with the accompanying drawings.

DETAILED DESCRIPTION

Figure 3:
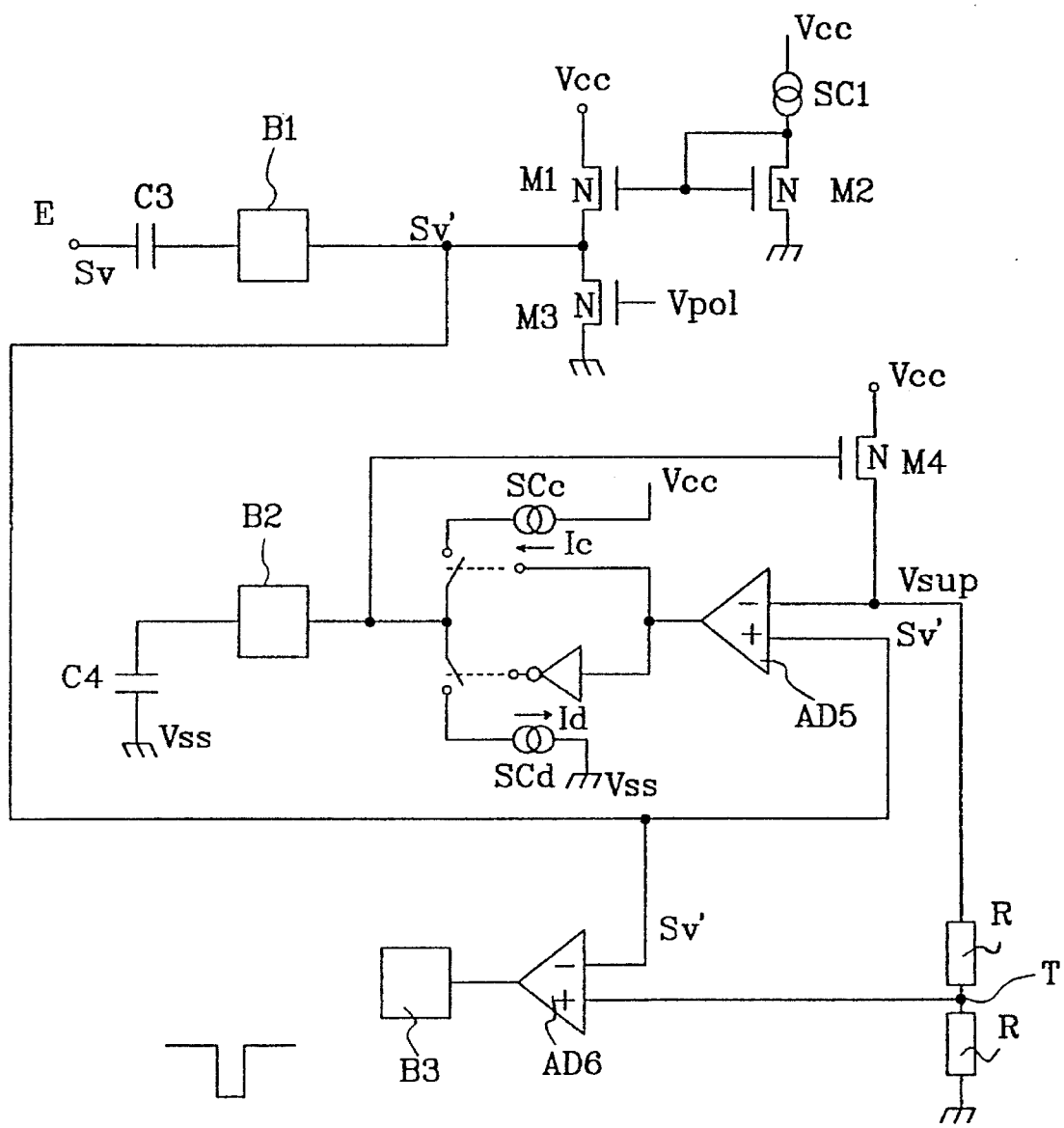
FIG. 3 shows a synchronization extracting circuit according to the invention.

The preferred embodiment of the invention is represented in FIG. 3.

The extracting circuit is coupled between a supply terminal Vcc and a ground terminal Vss. The ground terminal is theoretically at the lowest voltage, whereas terminal Vcc is at a positive voltage. However, a reversed arrangement could be devised by substituting a P-channel transistor for each N-channel transistor, and reciprocally, and by inverting at each time the polarities of the voltage differences in the circuit.

Figure 2:
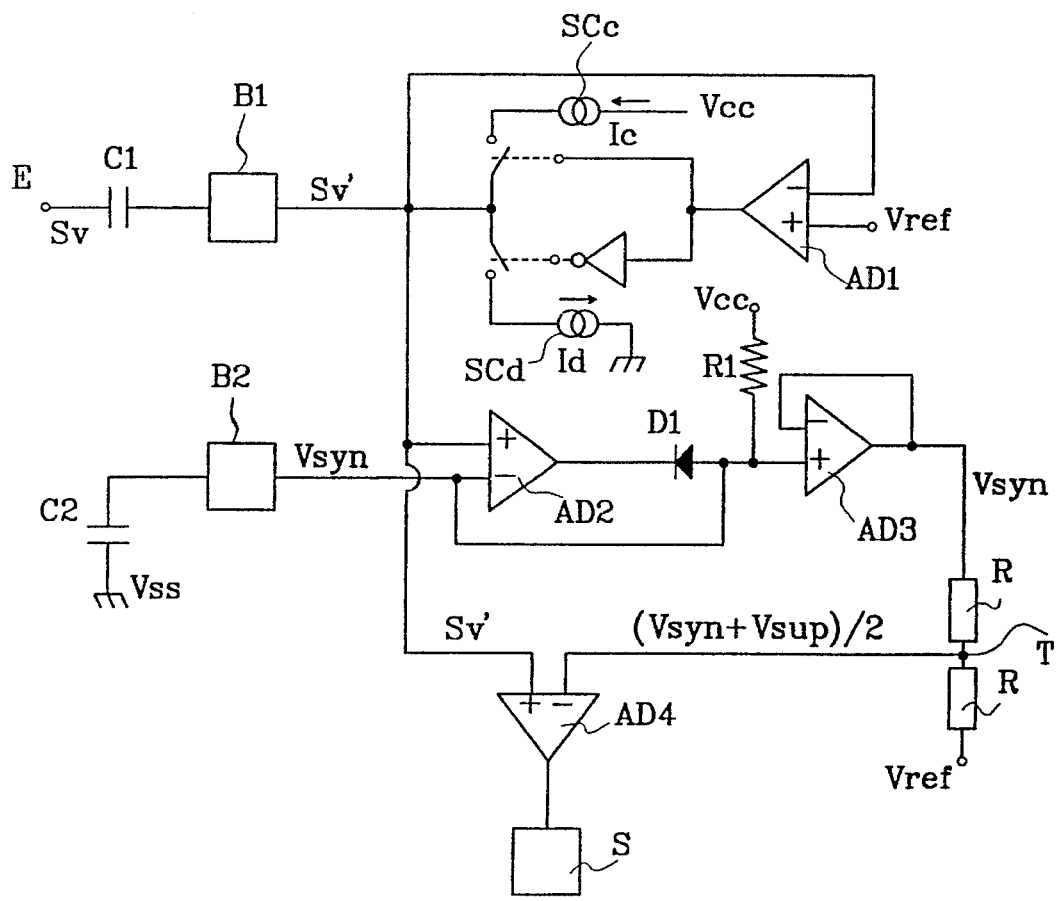
FIG. 2, already described, shows a conventional synchronization extracting circuit according to the prior art.

Unlike the circuit of FIG. 2, the circuit according to the invention includes a stage for aligning the low synchronization level (Vsyn) with ground instead of a stage for aligning the suppression level (Vsup) with a reference voltage.

This alignment stage includes a capacitor C3 serially connected between a terminal E operable to receive the composite video signal, and a terminal B1. Therefore, capacitor C3 has a first terminal receiving the non-aligned composite video signal Sv and a second terminal at which the aligned signal Sv' appears. The mean d.c. voltage across capacitor C3 represents the voltage offset required to align the low voltage of the synchronization interval with ground.

Capacitor C3 can be a capacitor external to the chip on which the extracting circuit is integrated. In that case, terminal B1, to which is connected the second terminal of the capacitor, is an input terminal of the integrated circuit.

A first field effect transistor (FET) M1 charges capacitor C3. The FET is designed so that charging can be rapidly achieved when the FET is rendered conductive by a suitable voltage level provided at its gate. The charging speed depends on the time allowed for establishing alignment.

The N-channel FET M1 has its source connected to terminal B1 and its drain connected, for example, directly to the positive supply voltage Vcc. The FET's gate is connected to a constant biasing source established by a second N-channel transistor M2 connected as a diode (with connected drain and gate) with its source to ground. Transistor M2 is fed by a low current source SC1 (approximately 1 μA).

Such an arrangement sets transistor M2 close to its conduction state. As a result, transistor M1, which has the same threshold voltage characteristics as transistor M2, is set to its conduction limit if its source is at the same voltage as ground; it becomes clearly conductive as soon as its source (terminal B1) tends to fall below the ground voltage.

The bigger the size of transistor M2, the more reliable is its conduction limit; on the contrary, the current source SC1 that feeds transistor M2 can be very low. Transistor M1 must be all the bigger in order to rapidly supply charging current to capacitor C3.

Last, a transistor M3 (or a current source, or alternatively a resistor forming a current leakage leg) is connected between terminal B1 and ground to ensure a slight discharging current of the capacitor C3. This discharging current allows for returning to the desired alignment when level Vsyn of signal Sv' tends to rise above the ground voltage. Transistor M3 is a small-size transistor because the discharging time constant of the capacitor in the latter case must remain long with respect to the charging time constant.

This circuit maintains on average, across capacitor C3, a constant charging such that the level Vsyn of Sv' constantly remains at the ground voltage.

The second portion of the extracting circuit is useful for establishing a constant voltage Vsup equal to the suppression level of signal Sv', i.e., equal to the voltage level of signal Sv' immediately before and immediately after the synchronization interval.

The stage for providing Vsup is based on the principle of charging and discharging a capacitor C4 with different charging and discharging currents, the ratio of which is correlated with the ratios between the time durations of the three portions of the composite signal.

Capacitor C4 has a first terminal connected to a fixed voltage point, preferably ground, Vss, and another terminal preferably connected to an external terminal B2 of the integrated circuit. The reason for such connection is that capacitor C4 is preferably external to the integrated circuit.

A differential amplifier AD5 operating as a comparator is connected so as to control either charging or discharging of the capacitor depending on whether the aligned composite signal Sv' is higher or lower than the suppression level Vsup. One of the inputs of amplifier AD5 receives signal Sv' and the other input receives voltage Vsup which is correlated with terminal B2 in that it tends to follow the variations of this voltage in a manner that will be described later on. For example, the non-inverting input (+) of the amplifier receives the signal Sv' from terminal B1. The inverting input (−) receives Vsup.

Assume that the charging current is Ic and discharging current Id, and that the voltage applied to the inverting input of amplifier AD5 has a value Vsup' or Vsup" which is not exactly the desired value Vsup, that is, not exactly the value of signal Sv' immediately before and immediately after the synchronization interval.

Figure 1:
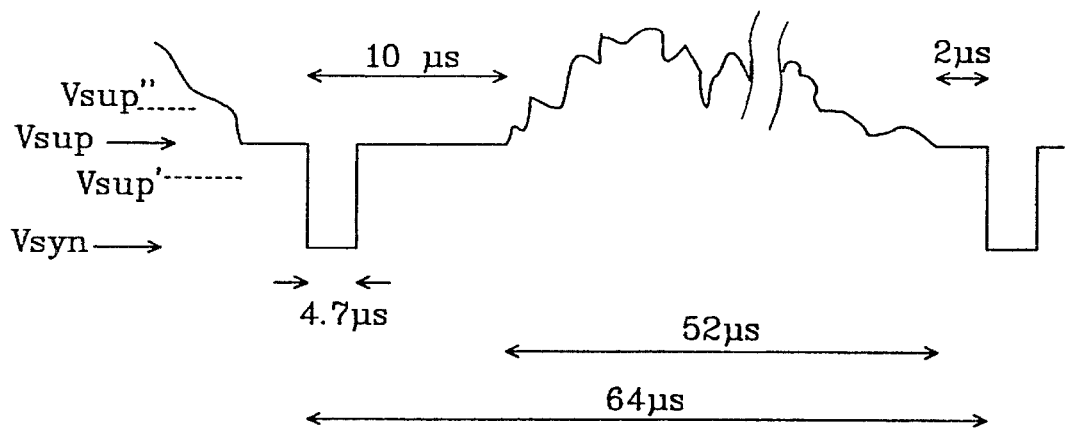
FIG. 1, already described, shows a composite video signal.

Assume that Vsup' is lower than Vsup (refer to FIG. 1). For approximately 4.7 μs at the most, signal Sv' will be lower than Vsup', so that comparator AD5 will control discharging of capacitor C4 with a current Id for 4.7 μs; and, for approximately 59.3 μs, comparator AD5 will control charging of the capacitor with a current Ic. The desired outcome is that the capacitor is charged in a direction tending to increase Vsup' up to Vsup. This is possible as long as the charging current Ic is at least equal to 1:12 of the discharging current Id because the charging and discharging times are, in this case, within a ratio of at least 12.

On the other hand, assume that the suppression level at input (−) of the comparator is Vsup", slightly too high with respect to the effective level Vsup of the aligned composite signal Sv'. Then, capacitor C4 must be discharged in a direction tending to decrease Vsup". However, the comparator AD5 will control discharging for approximately 12 μs at least, and will control charging for 52 μs at the most. Discharging of C4 will be obtained provided that the charging current is at the most equal to approximately 1:4 because the charging and discharging times are within a ratio of approximately 4.

The circuit will then constantly operate to bring voltage Vsup' or Vsup" back to the desired value provided that the ratio between Ic and Id is included within the above values, preferably, for example, equal to approximately 1:8 in one embodiment.

In order that the voltage variations at the inverting input of comparator AD5 are correlated with the voltage variations across capacitor C4, there is provided an N-channel transistor M4 whose gate is connected to capacitor C4 (terminal B2); its source is connected to the inverting input of comparator AD5, and its drain is fed, for example, by terminal Vcc. The voltage level Vsup of the inverting input is not the same as the voltage level of terminal B2, but varies when the voltage level of terminal B2 varies. It should be noted that the simple correlation of the variation directions ensures the proper operation of the circuit. Of course, the simplest condition is that the variation directions are the same: the voltage at the inverting input of comparator AD5 increases as the voltage across capacitor C4 increases. This is the case for transistor M4 which is connected as indicated above.

Therefore, voltage Vsup, representing the suppression level of the aligned video signal Sv', is obtained at the inverting input of comparator AD5.

A small-size resistor can be inserted between the source of transistor M4 and the amplifier without departing from the spirit of the invention.

The fabrication of the current sources SCc and SCd to provide charging and discharging currents, Ic and Id respectively, having determined ratios, does not raise any particular problem in MOS technology; one source being controlled by a state of the comparator, the other source by the reverse comparator state.

The third portion of the extracting circuit is the comparison circuit for comparing signal Sv' with a threshold (Vsup+ Vsyn)/2. Vsyn is equal to the ground voltage. A voltage divider is used to establish this threshold. Here, the divider is preferably a resistive divider with two resistors having a value R. The divider is connected between the inverting input of comparator AD5 and ground. The medium tap T of the divider is applied to an input of a high-gain differential amplifier (comparator) AD6, the other input receiving the video signal Sv' from terminal B1. The output of comparator AD6 provides the synchronization signal extracted from the composite signal. This output can be used inside the integrated circuit and/or be transmitted onto an external terminal B3.

It will be noted that the voltage divider resistors do not co-operate to discharge capacitor C4 since the latter is only connected to the gate of transistor M4.

Figure 4:
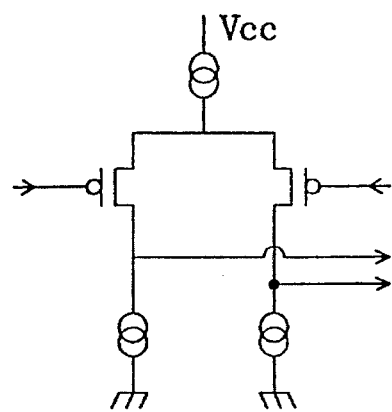
FIG. 4 schematically shows the input stage of a differential amplifier used in the circuit according to the invention.

Since the voltage levels involved in the comparisons are quite low, it is desirable that the amplifiers acting as comparators (AD5, AD6) each comprises a first input stage using P-channel MOS input transistors, as shown in FIG. 4. Of course, this is valid provided that ground Vss is the low supply voltage.

It should be noted that the extracting circuit above described has the further advantage of being very easily tested: indeed, it is an essential point to be capable of testing amplifiers AD5 and AD6, as well as transistors M1–M3. The amplifiers are easily tested since they have their two inputs and their output either directly or practically directly connected to terminals of the integrated circuit.

The operation of the alignment stage (M1–M3) is tested by terminal B1 it is simply necessary to provide a current/voltage characteristic at terminal B1 to check the behavior (thresholdless rectifier) of the assembly M1, M2, M3.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

I claim:

1. An MOS circuit for extracting a synchronization signal from a composite video signal, coupled between a supply voltage and a ground voltage, comprising:

an alignment circuit aligning the composite signal with a reference voltage to produce an aligned composite signal;

an output comparator comparing the aligned composite signal with a level that is intermediate between a low level of a synchronization interval of the composite video signal and a signal suppression level of the composite video signal;

a first stage aligning the low level with the ground voltage;

a second stage detecting the suppression level of the aligned composite signal including a first capacitor, a second comparator having a first input operable to receive the aligned composite signal and a second input operable to receive a second signal, the second comparator controlling charging or discharging of the first capacitor depending on a polarity of a voltage difference across the first and second inputs, and a negative feedback transistor having a gate connected to the first capacitor and a source connected to the second input of the second comparator to vary the voltage at the second input when charging of the first capacitor varies, in a direction correlated with the variation direction of the charging; and a voltage divider connected between the second input of said second comparator and the ground voltage, the output comparator having a first input connected to a medium tap of the divider and a second input receiving the aligned composite signal.

2. The extracting circuit of claim 1, wherein the output of said second comparator is connected so as to activate either a current source charging the capacitor or a discharging current source discharging the capacitor depending on the polarity of a voltage across its inputs, and wherein values of the charging and discharging currents are within a predetermined ratio.

3. The circuit of claim 2, wherein the ratio is equal to approximately 8.

4. The circuit of claim 1, wherein the comparators each include a differential input stage with two P-channel input transistors, and wherein the ground voltage is present on a low voltage terminal of the power supply.

5. The circuit of claim 1, wherein the alignment stage includes a second capacitor receiving at a first terminal the composite video signal in a non-aligned state and providing at a second terminal the aligned video signal, a first transistor adapted to rapidly charge the second capacitor as soon as the aligned composite signal falls below the ground voltage, a source of the first transistor being connected to the second terminal of the second capacitor and a gate of the first transistor being connected to a gate of a second transistor, connected as a diode and fed by a current source, a source of the second transistor being connected to the ground voltage.

6. The circuit of claim 5, including a current leakage leg between the second terminal of the second capacitor and the ground voltage.

7. A circuit for extracting a synchronization signal from a composite video signal, comprising:

means for aligning the composite video signal so that a low level of a synchronization signal in the composite video signal is aligned with a ground voltage to produce an aligned video signal;

means for detecting a level of a suppression signal in the aligned video signal and for establishing a constant voltage equal to approximately the level of the suppression signal in the aligned video signal, the means for detecting and establishing including means, responsive to at least a portion of a picture information signal of the aligned video signal, for charging a constant voltage capacitor to establish the constant voltage;

means, coupled to the means for detecting and establishing, for providing a threshold equal to approximately one half the constant voltage plus the ground voltage; and means, coupled to the means for providing a threshold and the means for aligning, for comparing the aligned video signal with the threshold to extract the synchronization signal and provide the synchronization signal at an output of the means for comparing.

8. The circuit of claim 7, wherein the means for aligning includes a first capacitor having first and second terminals, receiving on the first terminal the composite video signal and providing on the second terminal the aligned video signal, a first transistor, coupled to the second terminal of the first capacitor and adapted to rapidly charge the first capacitor when the aligned video signal falls below the ground voltage, and a second transistor, connected as a diode, coupled to and biasing the first transistor.

9. The circuit of claim 8, further comprising a current leakage leg coupled between the second terminal of the first capacitor and the ground voltage.

10. The circuit of claim 8, wherein the means for detecting and establishing includes a second capacitor and means for charging and discharging the second capacitor as a function of a difference between the suppression level of the aligned video signal and the constant voltage.

11. The circuit of claim 10, wherein the means for charging and discharging the second capacitor supplies charging and discharging currents in a predetermined ratio.

12. The circuit of claim 11, wherein the ratio is equal to approximately 8.

13. A circuit for extracting a synchronization signal from signal from a composite video signal, comprising:
   means for aligning the composite video signal so that a low level of a synchronization signal in the composite video signal is aligned with a ground voltage to produce an aligned video signal;
   means for detecting a level of a suppression signal in the aligned video signal and for establishing a constant voltage equal to approximately the level of the suppression signal in the aligned video signal the means for detecting and establishing including
   a capacitor, and
   means for charging and discharging the capacitor as a function of a difference between the suppression level of the aligned video signal and the constant voltage, wherein the means for charging and discharging includes a first comparator selecting one of a charging current source and a discharging current source and a feedback circuit including a first transistor coupled between a supply voltage and an input of the comparator and controlled by the constant voltage;
   means, coupled to the means for detecting and establishing, for providing a threshold equal to approximately one-half the constant voltage PLUS the around voltage; and
   means, coupled to the means for providing a threshold and the means for aligning, for comparing the aligned video signal with the threshold to extract the synchronization signal and provide the synchronization signal at an output of the means for comparing.

14. The circuit of claim 13, wherein the means for providing a threshold includes a voltage divider circuit, coupled between an input of the first comparator and a ground voltage and providing the threshold on a medium tap.

15. The circuit of claim 14, wherein the means for comparing includes a second comparator having a first input receiving the aligned video signal and a second input receiving the threshold.

16. A method of extracting a synchronization signal from a composite video signal, comprising the steps of:
   producing an aligned video signal by aligning the composite video signal so that a low level of a synchronization signal in the composite video signal is aligned with a ground voltage;
   detecting a level of a suppression signal in the aligned video signal and establishing a constant voltage equal to approximately the level of the suppression signal in the composite video signal, the step of detecting and establishing including the step of
   charging, in response to at least a portion of a picture information signal of the aligned video
   signal, a constant voltage capacitor to establish the constant voltage;
   providing a threshold equal to approximately one half the constant voltage plus the ground voltage; and
   comparing the aligned video signal with the threshold to extract the synchronization signal and providing the synchronization signal at an output.

17. The method of claim 16, wherein the step of detecting and establishing further includes the step of discharging the constant voltage capacitor as a function of a difference between the suppression level of the aligned video signal and the constant voltage.

18. The method of claim 17, wherein the step of charging includes charging the constant voltage capacitor with a charging current and the step of discharging includes discharging the constant voltage capacitor with a discharging current, a ratio between a value of the charging current and a value of the discharging current being a predetermined ratio.

19. The method of claim 18, wherein the ratio is substantially equal to 8.

20. The method of claim 16, wherein the step of producing an aligned video signal includes the step of rapidly charging an alignment capacitor when the aligned video signal falls below the ground voltage.

21. A method for extracting a synchronization signal from a video signal, the video signal including the synchronization signal, a suppression signal, and a picture signal, the synchronization signal having a lowest voltage level of the video signal, the method comprising the steps of:
   A. aligning the video signal so that the synchronization signal is at ground;
   B. generating a suppression voltage according to at least a portion of the picture signal of the aligned video signal; and
   C. comparing the aligned video signal with a value that is substantially equal to one half of the suppression voltage to extract the synchronization signal.

22. The method of claim 21, wherein step C includes the steps of:
   applying the suppression voltage to a first end of a voltage divider, the second end of the voltage divider being coupled to ground; and
   comparing the video signal with a voltage obtained from a mid-portion of the voltage divider.

23. An apparatus for extracting a synchronization signal from a video signal, the video signal including the synchronization signal, a suppression signal, and a picture signal, the synchronization signal having a lowest voltage level of the video signal, the apparatus comprising:
   a video signal alignment circuit that aligns the video signal so that the synchronization signal is at ground;
   means, coupled to the video signal alignment circuit, for generating a suppression voltage according to at least a portion of the picture signal of the aligned video signal; and
   a comparing circuit, coupled to the means for generating, that compares the aligned video signal with a value that is equal to substantially one half of the suppression voltage to extract the synchronization signal.

24. The apparatus of claim 23, wherein the comparing circuit includes:
 a voltage divider having a first end coupled to the means for generating to receive the suppression voltage, a second end coupled to ground, and a mid-portion that provides the value that is equal to substantially one half of the suppression voltage; and
 a comparator having a first input coupled to the video alignment circuit that receives the aligned video signal, a second input coupled to the voltage divider that receives the value, and an output that provides the extracted synchronization signal.

25. The method of claim 16, wherein the step of detecting and establishing further includes the step of charging the constant voltage capacitor as a function of a difference between the suppression level of the aligned video signal and the constant voltage.

* * * * *